(12) United States Patent
Fletcher

(10) Patent No.: US 12,033,143 B2
(45) Date of Patent: *Jul. 9, 2024

(54) DATA STORAGE AND MANAGEMENT AND METHODS OF THEREOF

(71) Applicant: Quantum Information Security, LLC, Everett, WA (US)

(72) Inventor: Timothy Fletcher, Everett, WA (US)

(73) Assignee: Quantum Information Security, LLC, Everett, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/156,765

(22) Filed: Jan. 19, 2023

(65) Prior Publication Data
US 2023/0153804 A1 May 18, 2023

Related U.S. Application Data

(63) Continuation of application No. 17/480,718, filed on Sep. 21, 2021, now Pat. No. 11,562,352.

(51) Int. Cl.
| | | |
|---|---|---|
| *G06Q 20/38* | (2012.01) | |
| *G06Q 20/40* | (2012.01) | |
| *G06Q 20/02* | (2012.01) | |
| *G06Q 20/06* | (2012.01) | |
| *G06Q 20/36* | (2012.01) | |

(52) U.S. Cl.
CPC ... *G06Q 20/3825* (2013.01); *G06Q 20/38215* (2013.01); *G06Q 20/3827* (2013.01); *G06Q 20/4014* (2013.01)

(58) Field of Classification Search
CPC ......... G06Q 20/3825; G06Q 20/38215; G06Q 20/3827; G06Q 20/4014; G06Q 20/065; G06Q 20/223; G06Q 20/3678; G06Q 20/3829; G06Q 20/389; G06Q 20/401; G06Q 20/4016; G06Q 20/02
USPC .......................................................... 705/64
See application file for complete search history.

(56) References Cited

U.S. PATENT DOCUMENTS

| | | | |
|---|---|---|---|
| 2020/0074470 A1 | 3/2020 | Deshpande et al. | |
| 2020/0125269 A1* | 4/2020 | Karame | H04L 9/0643 |
| 2020/0250683 A1* | 8/2020 | Padmanabhan | G06Q 20/38215 |
| 2020/0389313 A1* | 12/2020 | Singh | H04L 9/0637 |

OTHER PUBLICATIONS

"Channel Configuration", 10 pages, dated 2020 (Year: 2020).*
Blockchain Node Providers ("Blockchain Node Providers and How They Work", dated Mar. 3, 2021, 11 pages (Year: 2021).*
"Selective Blockchain Transaction Pruning and State Derivability", Nov. 5, 2018, pp. 31-40 (Year: 2018).*
"Pruning Blockchain, what does it remove?", https://bitcoin.stackexchange.com/questions/101044/pruning-blockchain-what-does-it-remove (Year: 2021).*

(Continued)

*Primary Examiner* — James D Nigh
(74) *Attorney, Agent, or Firm* — Reinhart Boerner Van Deuren s.c.

(57) ABSTRACT

Described herein are various methods of sharing data across multiple computers. The method of sharing data permits the pruning of data from the shared data.

20 Claims, 7 Drawing Sheets

(56) References Cited

OTHER PUBLICATIONS

"State Tree Pruning", Posted by Vitalik Buterin on Jun. 26, 2015, downloaded from https://blog.ethereum.org/2015/06/26/state-tree-pruning/#.-.text=The%20alternative%20approach%20is%20to,treee%2C%20and%20at%20that%20point (Year: 2015).*

"Channel Configuration", downloaded from https://hyperledger-fabric.readthedocs.io/en/release-2.2/configtx.html and attached as a PDF file, dated 2020. (Year: 2020).

Blockchain Node Providers ("Blockchain Node Providers and How They Work", dated Mar. 3, 2021, downloaded from https://www.infoq.com/articles/blockchain-as-a-service-get-block/ and attached as a PDF file). (Year: 2021).

"Selective Blockchain Transaction Pruning and State Derivability," dated 2018, downloaded from https://ieeexplore.ieee.org/stamp/stamp.jsp?arnumber=8525390 and attached as PDF file, (Year: 2018).

"State Tree Pruning", Posted by Vitalik Buterin on Jun. 26, 2015, downloaded from https://blog.ethereum.org/2015/06/26/state-tree-pruning/#:-:text=The%20alternative%20approach%20is%20to, tree%2C%20and%20at%20that%20point and attached as PDF file. (Year: 2015).

* cited by examiner

DATA STORAGE AND MANAGEMENT AND METHODS OF THEREOF

CROSS-REFERENCE TO RELATED PATENT APPLICATION

This application is a continuation of U.S. application Ser. No. 17/480,718, filed Sep. 21, 2021, which is incorporated herein by reference in its entirety.

BACKGROUND OF THE INVENTION

The present invention relates generally to computer data. The present invention relates specifically to methods of storing and managing data.

Managing data distribution across computers and computer networks has been practiced for as long as computers have existed. One approach is to share data across multiple computers in the form of chains of data, such as a block chain.

SUMMARY OF THE INVENTION

According to one embodiment, an exemplary method of using the invention includes securely communicating and storing information among a network of computing devices. The method includes, generating a first block of a block chain, the first block including a second reference data portion. The method further includes generating a second block of the block chain, the second block corresponding to a first transaction. The second block includes a first reference data portion based at least in part on the second reference data portion, a second reference data portion, the second reference data portion being configured to correspond to a third block. The second block further includes a type block of data that indicates a type of the first transaction. The second block further includes a transaction detail block of data that includes information describing the first transaction. The second block further includes an ordering block of data that corresponds to an order in the block chain of the second block relative to the first block. The second block further includes a signature block of data that identifies an entity.

According to another embodiment, an exemplary method of using the invention includes a method of securely communicating and storing information among a network of computing devices. The method includes generating a first block of a block chain, the first block including a second reference data portion. The method further includes generating a second block of the block chain, the second block corresponding to a first transaction. The second block includes a first reference data portion based at least in part on the second reference data portion of the first block, a second reference data portion that is configured to correspond to a third block, and a type block of data that indicates a type of the first transaction. The second block further includes a transaction detail block of data that includes information describing the first transaction, and an ordering block of data that corresponds to an order in the block chain of the second block relative to the first block. The method further includes generating the third block of the block chain, the third block corresponding to a second transaction. The third block includes a first reference data portion based at least in part on the second reference data portion of the second block, a second reference data portion that is configured to correspond to a fourth block, and a type block of data that indicates a type of the second transaction. The third block further includes a transaction detail block of data that includes information describing the second transaction, and an ordering block of data that corresponds to an order in the block chain of the third block relative to the first block and the second block.

According to another embodiment, an exemplary method of using the invention includes method of securely communicating and storing information among a network of computing devices. The method includes generating a first block of a block chain according to a first configuration setting, the first block including a second reference data portion. The method further includes generating a second block of the block chain according to the first configuration setting, the second block corresponding to a first transaction. The second block includes a first reference data portion based at least in part on the second reference data portion, a second reference data portion, the second reference data portion being configured to correspond to a third block, and a transaction detail block of data that includes information describing the first transaction. The second block further includes an ordering block of data that corresponds to an order in the block chain of the second block relative to the first block.

The accompanying drawings are included to provide further understanding and are incorporated in and constitute a part of this specification. The drawings illustrate one or more embodiments and, together with the description, serve to explain the principles and operation of the various embodiments.

DETAILED DESCRIPTION

Referring generally to this disclosure, described herein are various methods of sharing data. In contrast to current data distribution management systems, the methods and embodiments described herein can operate with or without a central authentication entity and provide a reduced data footprint on computers that are sharing data. In various embodiments, described herein is a method of securely communicating and storing information among a network of computing devices. In various embodiments, the data storage and management and methods of use thereof utilize a pure zero trust architecture.

Figure 1:
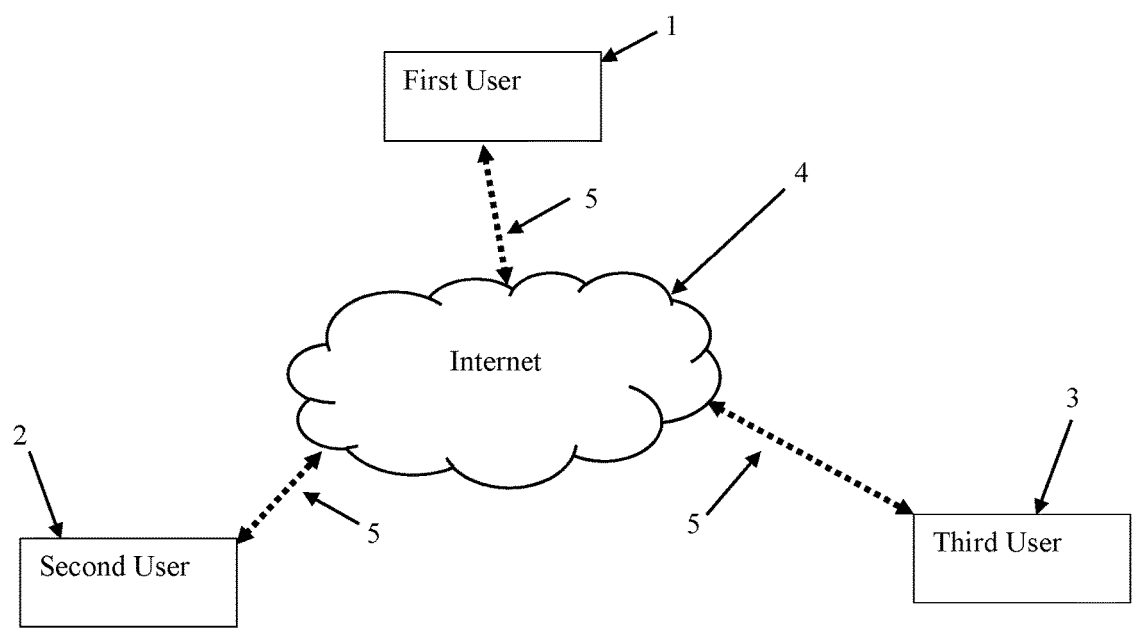
FIG. 1 is a network of multiple people and computers, according to an exemplary embodiment.

Referring to FIG. 1, in various embodiments, first user 1, second user 2, and third user 3 are communicatively connected via an electronic network, such as a computer network, shown as internet 4. In a specific embodiment, each of first user 1, second user 2, and third user 3 utilize one or more electronic devices, such as computers (e.g., desktop, laptop, smart phone). Each of the electronic devices communicates with the other electronic devices via communication channels 5, such as TCP/IP communications over internet 4.

As will be described in more detail below, the users collectively create, read, and modify a block chain of data. Although the description below will often refer to users performing tasks, such as generating a block of data, it will be understood that the reference to users below includes the respective user and the one or more computers of the respective user. In various embodiments, the entity and/or user performing the tasks are an individual, a group of people, computing devices being used by people, system processes on a computer, processes, threads, and/or functions.

Figure 2:
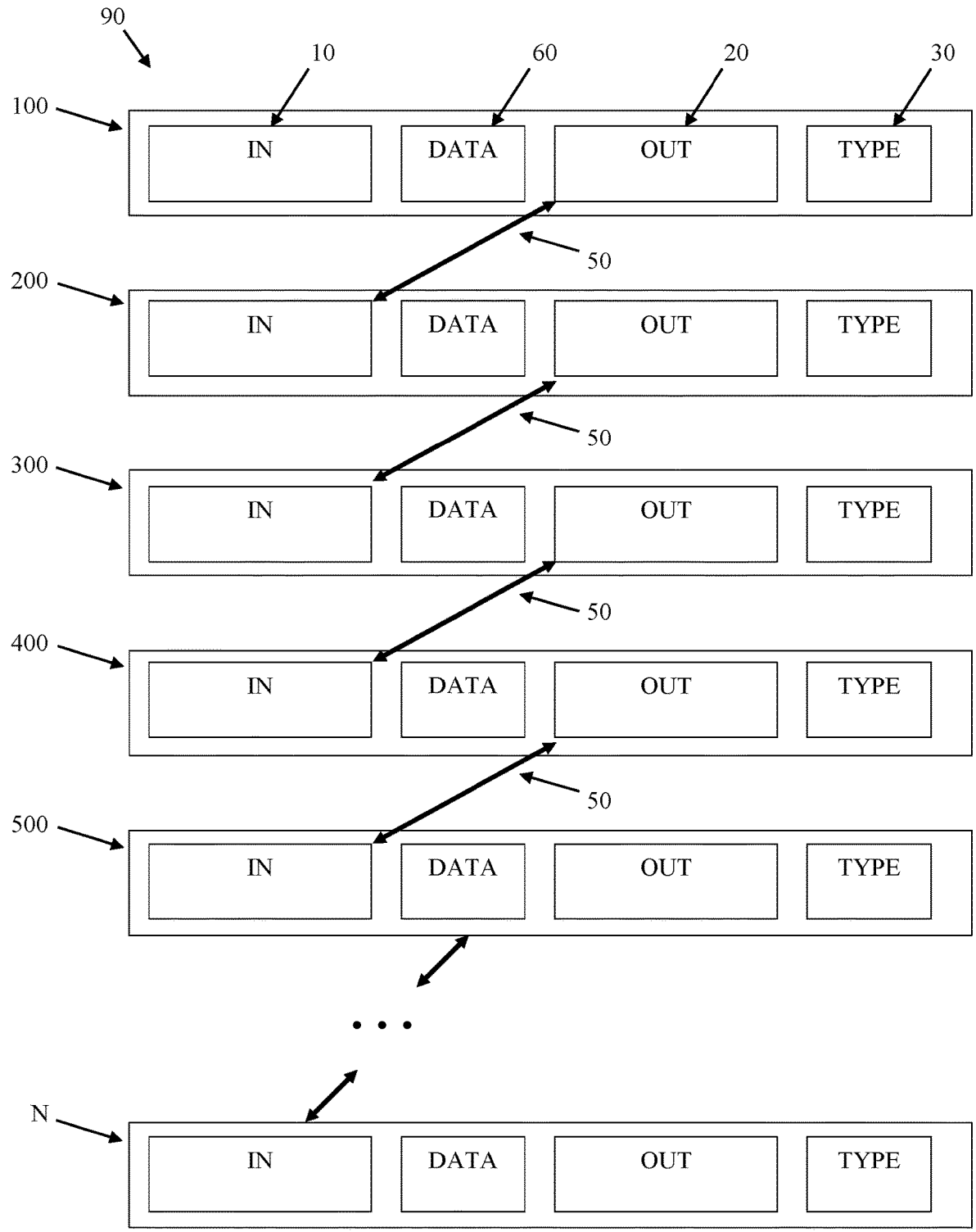
FIG. 2 is a chain of data, such as a block chain, according to an exemplary embodiment.
Figure 3:
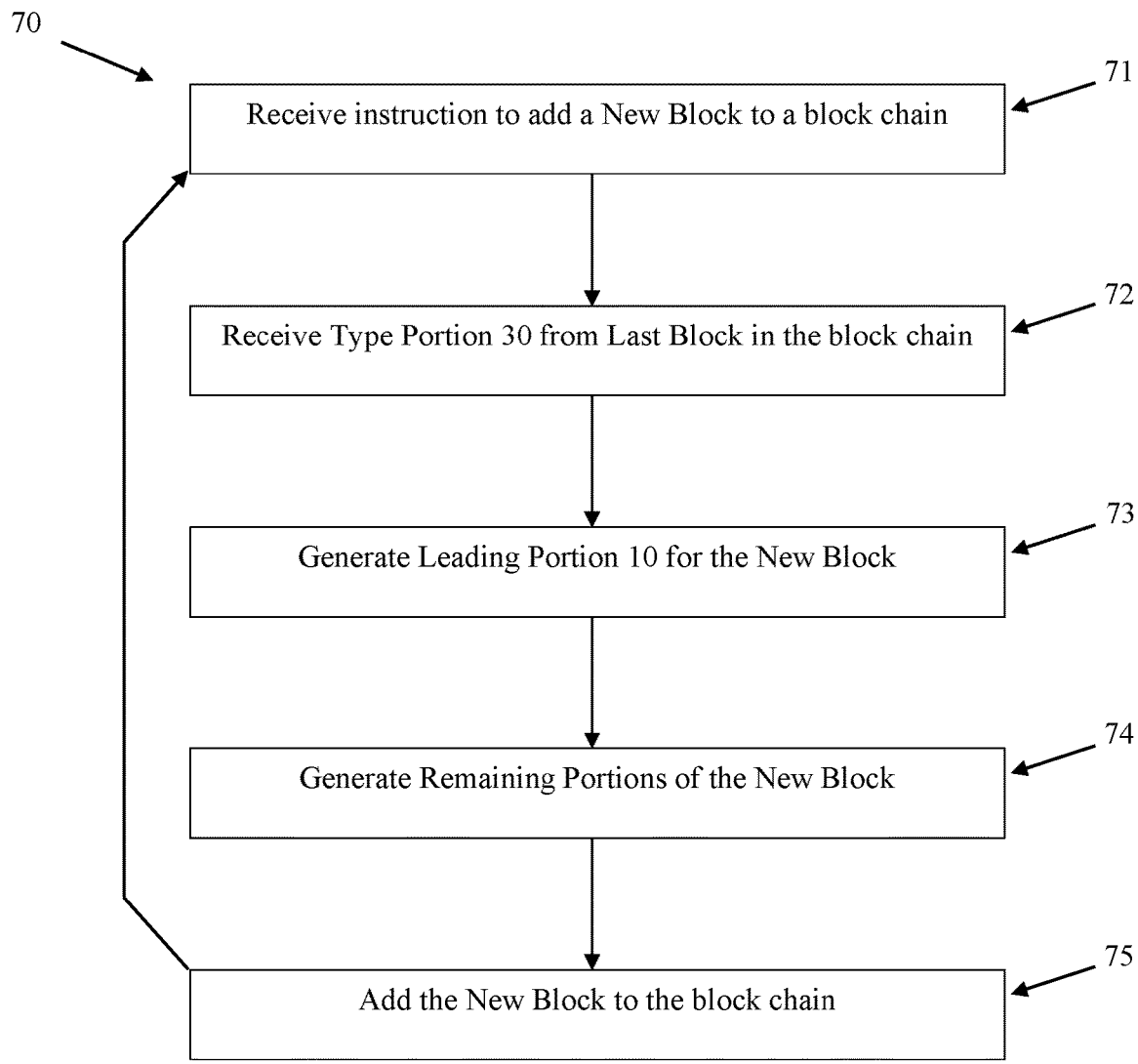
FIG. 3 is an exemplary method of adding a block to a block chain, according to an exemplary embodiment.

Referring to FIGS. 2-3, various aspects of block chain 90, including an exemplary method for creating block chain 90, are shown. FIG. 2 depicts an exemplary block chain 90, and FIG. 3 depicts an exemplary method for making blocks in block chain 90.

Referring to FIG. 2 in particular, block chain 90 includes one or more blocks of data, shown as blocks 100, 200, 300, 400, 500, through block N. It will be understood that the ellipsis in FIG. 2 indicates that block chain 90 may include any number of blocks between block 100 and block N.

Block 100 includes a first reference data portion 10, a data portion 60, a second reference data portion 20, and a type portion 30. In a specific embodiment, each of first reference data portion 10, data portion 60, second reference data portion 20, and type portion 30 encompass one or more bytes within block 100. As shown in FIG. 2, block 100 includes first reference data portion 10, data portion 60, second reference data portion 20, and type portion 30, and it will be understood that each of blocks 200, 300, 400, 500, and 600 also includes one or more of first reference data portion 10, data portion 60, second reference data portion 20, and type portion 30.

To start creating block chain 90, a user initially generates first block 100 of block chain 90, which can be referred to as the genesis block. To create block 100, first reference data portion 10 of block 100 is created by first creating a Maker Key. Once the first reference data portion 10 is created, then the Maker Key is destroyed. As a result of the Maker Key being destroyed, block 100 may not be altered or recreated.

The user creating block 100 also creates second reference data portion 20 of block 100. Second reference data portion 20 includes a portion of data, such as a hash. Second reference data portion 20 is configured to correspond (e.g., identify) a block subsequent to block 100. For example and as will be described, first reference data portion 10 of a subsequent block (e.g., block 200) is based at least in part on second reference data portion 20 of block 100. The user creating block 100 also generates data portion 60. In a specific embodiment, data portion 60 in block 100 does not include substantive data. In a specific embodiment, type portion 30 of block 100 indicates that block 100 is the origin, or first, block in block chain 90. The user, or more specifically the user's computer, generates block 100 including one or more of first reference data portion 10, data portion 60, second reference data portion 20, and type portion 40. After block 100 is created, the user (e.g., first user 1) communicates block 100 to parties (e.g., second user 2, third user 3) that are interested in participating and/or monitoring block chain 90.

Referring to FIG. 3, subsequently a user sends an instruction to a computer to add a block, e.g., block 200, to the block chain 90 that only includes block 100 (step 71 in FIG. 3). For example, User 2 identifies a transaction that User 2 would like to memorialize and/or add to the block chain 90. In various embodiments, for exemplary purposes only the transaction may be a transfer of money, such as of electronic currency (eCurrency), a contract, a warranty, a sale, a document, an object, an executable object, a data payload such as a self-explanatory data payload such as XML, an Independent Object Model procedure, and/or a binary tree. Based on the transaction that was selected, the User 2 creates type portion 30 (step 72) that corresponds to a transaction, such as a first transaction. In various embodiments, type portion 30 of second block 200 corresponds to a type of the transaction (e.g., a type of the first transaction). For example, type portion 30 may include a number between 1 and X (e.g., between 1 and 50), with each number corresponding to a different type of transaction. As another example, type portion 30 may include pins to an object.

Then, a user generates a first reference data portion 10 of the new block (step 73). First reference data portion 10 of block 200 is based at least in part on second reference data portion 20 of the last block of the block chain, which in this example is block 100. Thus, second reference data portion 20 is configured to correspond to first reference data portion 10 of a subsequent block, and first reference data portion 10 corresponds to second reference data portion 20 of a preceding block. Hence, the bidirectional aspects of correspondence 50 (FIG. 2). An ordering data block, shown as timestamp portion 64, is also created for adding to block 200. The ordering data block corresponds to an order in block chain 90 of the second block 200 relative to the first block 100 (e.g., the second block is immediately subsequent to first block 100; the second block is in block chain 90 at some location subsequent to first block 100).

Then, one or more additional elements in block 200 are created and block 200 is generated (step 74). For example, the transaction detail portion 62 includes information describing the transaction, such as one or more details of the contract between the parties. In a specific embodiment, the transaction detail portion 62 is encrypted so that only individuals with a decryption key can view some or all of the data in the transaction detail portion 62. Second reference data portion 20 of block 200 is generated at least in part based on first reference data portion 10. In a specific example, the transaction corresponding to the second block 200 corresponds to a document, and the second block 200 does not include the document.

Finally, the new block, in this example block 200, is added to the block chain 90. This process is repeated as many times as desired. Referring to the block chain 90 in FIG. 2, this process is repeated until the block chain 90 includes blocks 200, 300, 400, 500, through block N. Although block chain 90 includes six blocks, it will be understood that block chain 90 may be generated and modified to include any number of blocks. In one example the entity that generated block 200 (e.g., User 2) may different than the entity that generated block 100, but it will be understood that user 1 or user 3 may generate block 200.

When generating block chain 90, one or more decision-making methodologies may be practiced to select which block should be added. For example, if two users (e.g., user 1 and user 2) simultaneously create a block of data to add to block chain 90, then a decision is made which block gets added first. In a specific embodiment, the block with the older timestamp is added to block chain 90 first. It is contemplated herein that any number of blocks could be added, hence the arrow from step 75 to step 71, which may be executed any number of times (e.g., zero or more).

In various embodiments, blocks in block chain 90 are initially configured according to a first configuration setting. Subsequently, the block chain is reconfigured to a second configuration setting different than the first configuration setting. For example, if a qualified entity submits a request to reconfigure the block chain 90, then the block chain 90 is reconfigured to the second configuration setting. In various embodiments, the determination regarding whether the entity is a qualified to reconfigure block chain 90 (e.g., if the entity is a qualified entity) involves proving the qualified entity generated a portion of the first block 100, such as the first reference data portion of the first block 100.

After the configuration of block chain 90 has been changed to second configuration setting, blocks that are subsequently added to block chain 90 are configured consistent with the second configuration setting. For example, a given block chain 90 may include a first block 100 and second block 200 configured according to a first configuration setting, and a third block configured according to second configuration setting.

In various embodiments, a block may be added to block chain 90 that refers to a second block chain. As an example, a block may be added to block chain 90 that identifies the first block of a second block chain other than block chain 90. In a specific embodiment, the block referring to the second block chain has a transaction type that identifies that block as referring to the second block chain. In various embodiments the second block chain is functionally similar to block chain 90.

In various embodiments, when a block is added to block chain 90 that refers to the second block chain, that block may not be deleted from block chain 90 until the second block chain has been closed. In one example, block chain 90 includes data indicating a time to live for the second block chain, and when the time to live expires then the block adding the second block chain is deleted. It is contemplated herein that a single block chain 90 may include blocks that refer to a plurality of different block chains, and one or more of those different block chains may themselves include block(s) that refer to yet more different block chain(s).

Figure 4:
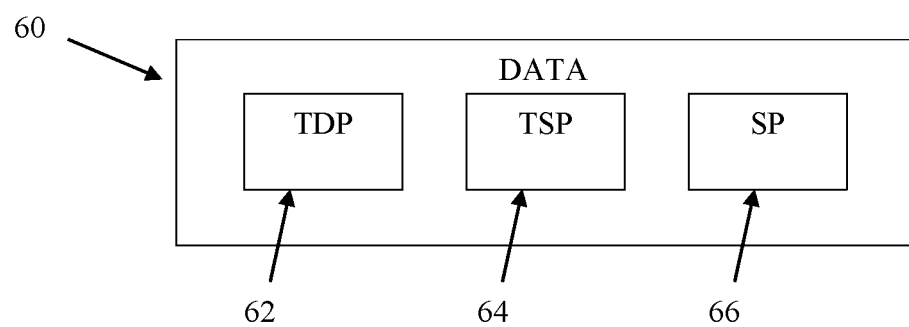
FIG. 4 is a data portion block of the chain of data of FIG. 2, according to an exemplary embodiment.

Referring to FIG. 4, to provide further detail on the creation of data portion 60, the user 2 creates data portion 60 based on the selected transaction. Data portion 60 includes one or more transaction detail portion 62, an ordering data block, shown as timestamp portion 64, and signature block 66. In various embodiments, the ordering data block may be any series of elements provided that the counting portion is atomic and provides a progression order of the elements. In various examples, the signature block 66 is encrypted.

Transaction detail portion 62 includes aspects of the transaction. As a first example, if the transaction is a transfer of an electronic currency, the transaction detail portion 62 includes a portion identifying the transferor, a portion identifying the recipient, and a portion identifying the quantity and/or type of eCurrency being transferred. As a second example, if the transaction is a document, the transaction detail portion 62 includes a copy of the document (e.g., a clear-text copy of the document, a hashed and/or encrypted copy of the document).

Timestamp portion 64 includes an indication of a time when timestamp portion 64 is generated. For example, timestamp portion 64 includes data indicating a current date and/or time on the computer user 2 is using. Signature block 66 includes data indicating and/or uniquely identifying the identity of an entity, such as User 2. In various embodiments, signature block 66 identifies an entity, such as by uniquely identifying an entity.

Figure 5:
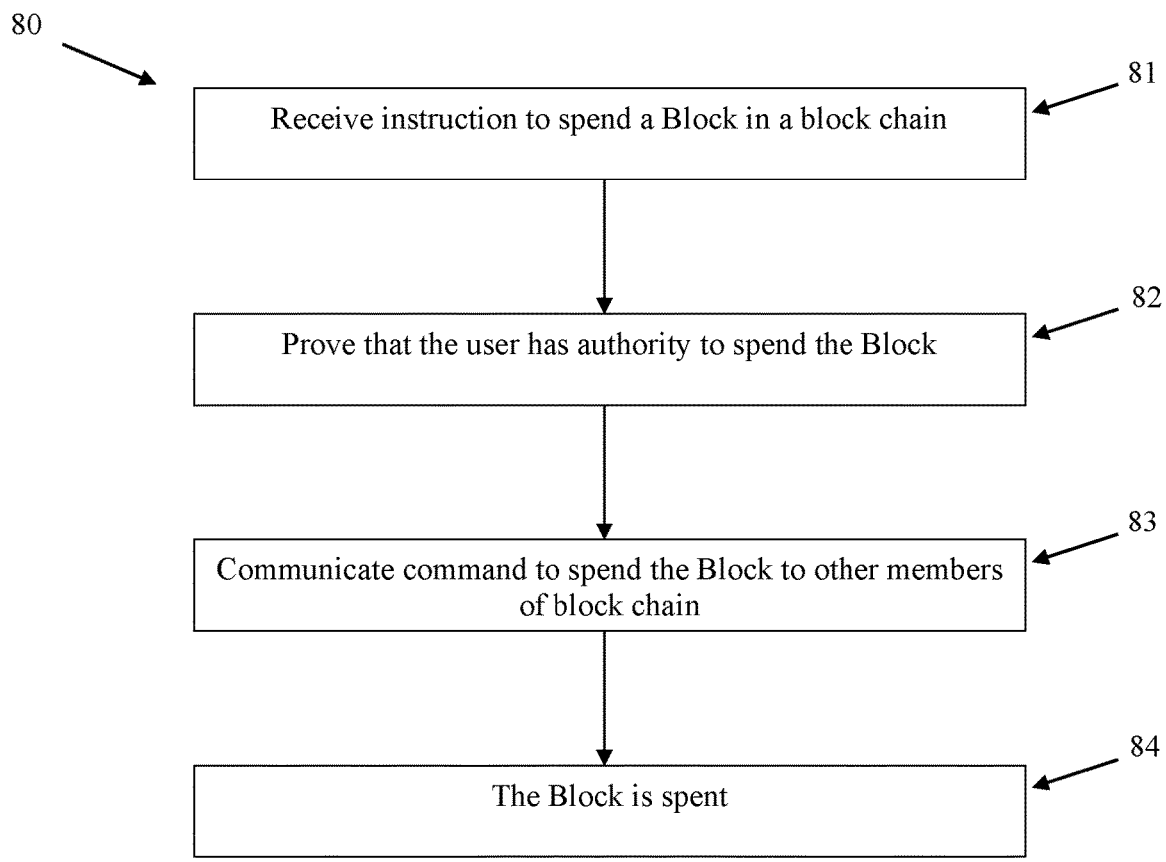
FIG. 5 is an exemplary method of removing a block from the block chain of FIG. 2, according to an exemplary embodiment.
Figure 6:
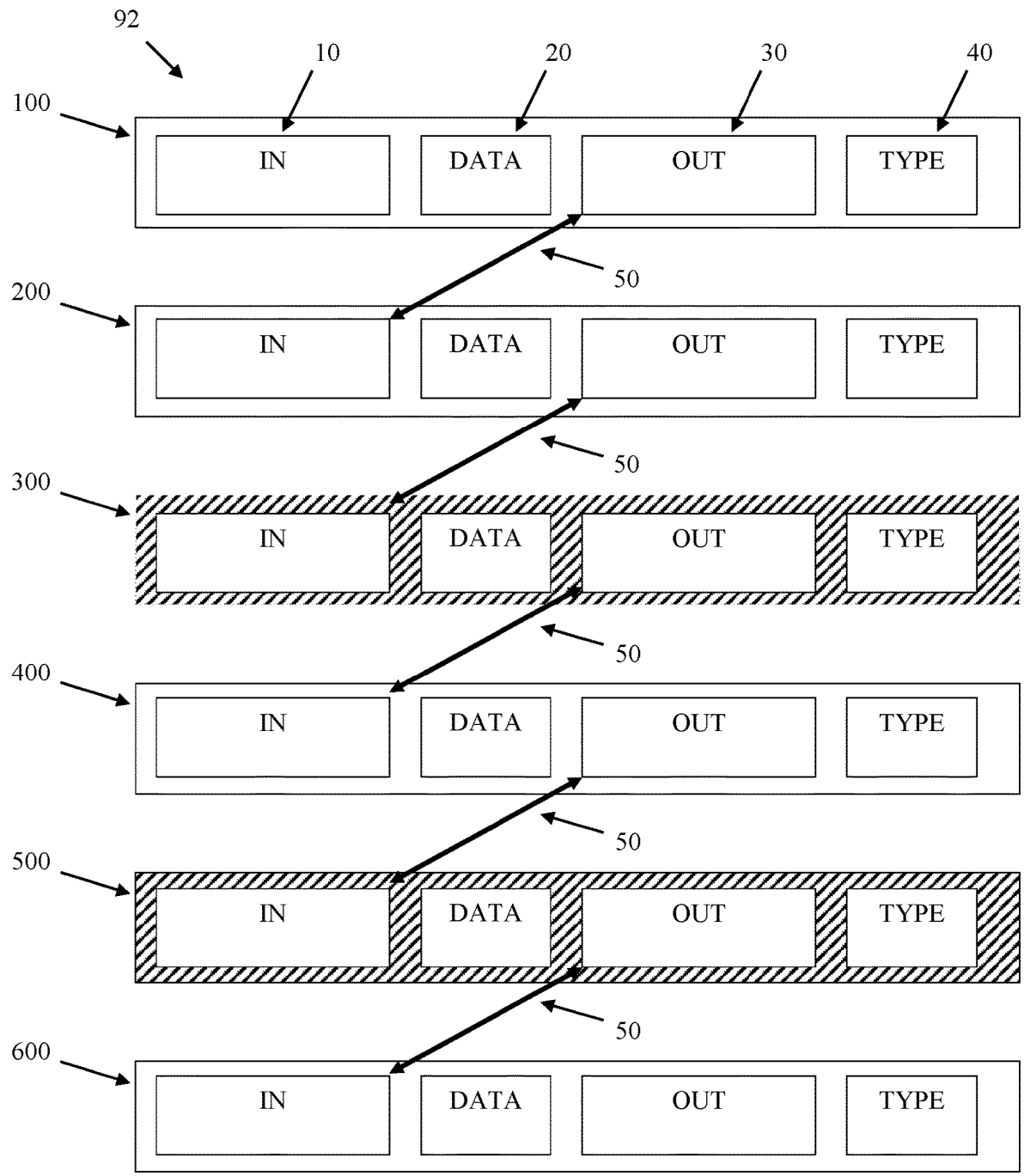
FIG. 6 is a chain of data, according to an exemplary embodiment.
Figure 7:
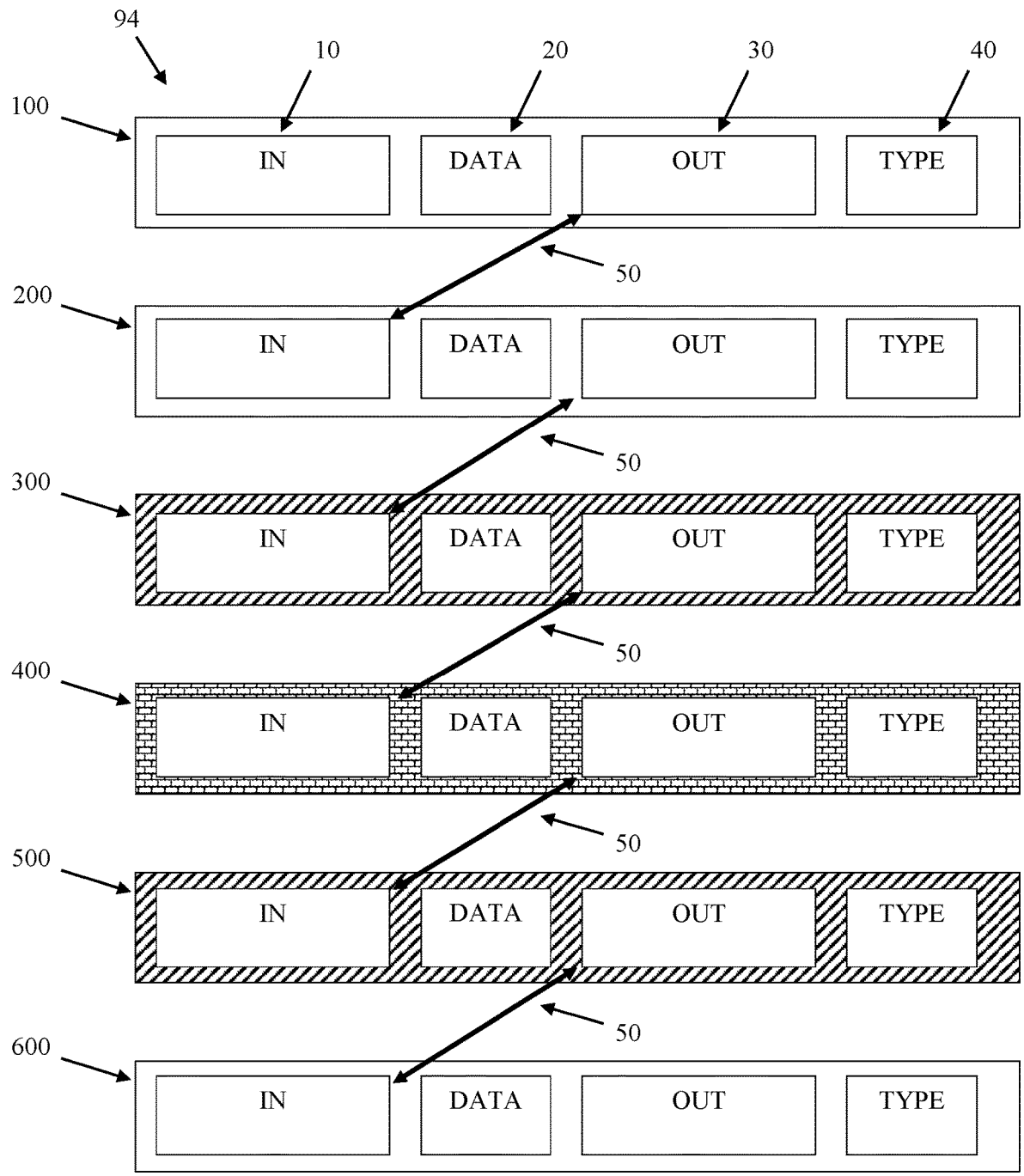
FIG. 7 is the chain of data of FIG. 6 with modifications, according to an exemplary embodiment.

Referring now to FIGS. 5-7, in various embodiments one or more blocks in the block chain can be spent. FIG. 5 depicts an exemplary method for spending a block in a block chain, FIG. 6 depicts block chain 92, and FIG. 7 depicts block chain 94. Block chain 92 (FIG. 6) and block chain 94 (FIG. 7) are the same as block chain 90 except as described below. In particular, block chain 92 and block chain 94 are the same as block chain 90 except that one or more of the blocks in block chain 90 have been spent and/or pruned.

In a specific embodiment, the first block, block 100, cannot be spent. In another specific embodiment, the last block, block 600 in FIG. 6, cannot be spent. In another specific embodiment, neither the first block nor the last block can be spent.

Referring to FIG. 5, an exemplary method 80 of spending a block is described. To start, a user initiates an instruction to spend a block in a block chain (step 81).

In order for one or more users to spend a block, the one or more users must prove they own the respective block in the block chain (step 82). In a specific example, a user or process authenticates their authority to spend and/or use a block by providing an authenticating block that is compared to the signature block 66 of the respective block. In a specific embodiment, for example a contract between two parties, both parties need to provide authority to delete the respective block.

Once authenticated, the user communicates a command to other members of the block chain to spend the desired block (step 83).

Once the command is received, the users modify a validity portion of the respective block to indicate that the block is invalid, such as the block being spent (step 84). As will be described in more detail below, if the recently-invalidated block is between other blocks that have also been invalidated, the recently-invalidated block is pruned from the block chain. Once a block is pruned from the block chain, the block can no longer be retrieved.

As a first example, user 3 added block 300 to include a contract between user 3 and user 1. After the contract has been executed, both user 3 and user 1 agree the contract can be removed from block chain 90. However, block 300, which includes the contract, cannot be removed from block chain because block 300 includes a reference to block 200 (e.g., first reference data portion 10 of block 300 is based on second reference data portion 20 of block 200) and because block 300 includes a reference to block 400 (e.g., first reference data portion 10 of block 400 is based on second reference data portion 20 of block 300). Block 300 is shown in diagonal cross-hatching because block 300 is spent (e.g., is invalid) and is in condition to be removed from block chain 90.

Referring to FIGS. 6-7, various stages of spending blocks are shown. Blocks that are not spent are shown with a blank white background (e.g., blocks 100, 200, 400, and 600 in FIG. 6). Blocks that are spent are shown with a diagonal background (e.g., blocks 300 and 500 in FIG. 7). Blocks that have been pruned from the block chain are shown with a brick background (e.g., block 400 in FIG. 7).

Referring to FIG. 6, blocks 300 and 500 have been spent. Blocks 300 and 500 are shown with diagonal cross-hatching because they have been spent. However, block 500 may not be pruned from block chain until neighboring blocks 400, 600 are spent. Similarly, block 300 may not be pruned from block chain until neighboring blocks 200, 400 are spent.

In various embodiments, after a new user request block chain 90 then blocks that are not spent (e.g., that are still valid) are transmitted to a new user when the new user (e.g., a person, a process) requesting the block chain 90. Additionally, blocks that are spent but neighbor unspent blocks (e.g., block 300 and block 500 in FIG. 6) are transmitted to a new user when the new user (e.g., a person, a process) requests the block chain 90.

Referring to FIG. 7, one or more users have determined that the data from block 400 can be removed because block 400 has been spent. Block 400 is shown in with a brick background because block 400 is in condition to be removed (e.g., pruned) from the block chain because both neighboring blocks are spent. As a reminder, block 300 and block 500 were already spent.

Given this condition, block 400 may be pruned from block chain because (1) block 400 itself is spent, and (2) neighboring blocks 300, 500 are spent. However, blocks 300, 500 may not be removed yet because their respective neighboring blocks, blocks 200, 400, respectively, are not yet in condition to be removed from block chain 90.

In various other embodiments, block chain 90 includes a single original block 100, and multiple second blocks 200 that are at least in part based on first block 100. For example, block 100 is the top node and two or more second blocks 200 are secondary nodes that are each directly connected to top node.

For exemplary purposes only and without limitation it is contemplated herein that the computing device may be a desktop, a laptop, a personal electronic device (e.g., cell phone, tablet, smartwatch), a thin client, a virtual machine on a larger physical machine (or machines) that hosts one or more multiple virtual machines, an embedded system (e.g., a computer within a car, a computer within a vehicle, a computer within a device and/or tool), and/or a server.

In various embodiments, the computer includes one or more of a processor, a memory, an output interface, and an input interface. The one or more of a processor is one or more of a general processor unit, an ASIC, a Field Programmable Gate Array (FPGA), firmware and/or a graphics processor. The memory is one or more of a hard drive, a RAM, and/or a processor cache. The output interface is one or more of a network interface card, and/or a display. The input interface is one or more of a keyboard, a mouse, a network interface card (which may also function as an output interface card), and/or touchscreen display. It is further considered herein that computer network over which communications occur may be one or more of an intranet, the Internet, and/or any electronic network of one or more computing devices. It is contemplated herein that any computer device may practice this disclosure, including, for exemplary purposes only and without limitation, a cell phone, a smartwatch, a tablet, a laptop, and/or a desktop.

In a specific embodiment, the steps of this disclosure are practiced by a system, such as a computing device, that includes at least one processor and a memory storing instructions that, when executed by the at least one processor, cause the system to perform one or more of the steps and/or processes described herein.

In another specific embodiment a system, such as a computing device, includes at least one processor and a memory, such as a non-transitory computer-readable storage medium including instructions that, when executed by the at least one processor, cause the system to perform one or more of the steps and/or processes described herein.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A method of securely communicating and storing information among a network of computing devices comprising:

generating a first block of a block chain, wherein the block chain is configured according to a first configuration setting and the first block is generated consistent with and based on the first configuration setting, the first block comprising a second reference data portion;

generating a second block of the block chain and adding the second block to the block chain including the first block, wherein the second block is generated consistent with and based on the first configuration setting, the second block corresponding to a first transaction, the second block comprising:

a first reference data portion based at least in part on the second reference data portion of the first block;

a second reference data portion, wherein the second reference data portion of the second block is configured to correspond to a third block;

a type block of data that indicates a type of the first transaction;

a transaction detail block of data that includes information describing the first transaction;
an ordering block of data that corresponds to an order in the block chain of the second block relative to the first block; and
a signature block of data that identifies an entity;
reconfiguring the block chain according to a second configuration setting different than the first configuration setting; and
generating the third block of the block chain and adding the third block to the block chain including the first block and the second block, the third block corresponding to a second transaction, wherein the second block is generated consistent with and based on the second configuration setting, the third block comprising a first reference data portion based at least in part on the second reference data portion of the second block.

2. The method of claim 1, the first block comprising a type block of data that indicates the first block is an origin block of the block chain.

3. The method of claim 2, further comprising:
modifying a validity portion of the second block to indicate that the second block is invalid.

4. The method of claim 1, wherein the entity is an individual.

5. The method of claim 4, wherein the signature block of data of the second block is encrypted.

6. The method of claim 1, wherein the first transaction corresponds to a document, and wherein the second block does not include the document.

7. The method of claim 1, the first block comprising a first reference data portion, wherein the block chain is reconfigured to the second configuration setting in response to a qualified entity requesting the reconfiguration, the method further comprising determining the qualified entity is qualified to change the configuration of the block chain by proving the qualified entity generated the first reference data portion of the first block. invalid.

8. The method of claim 7, further comprising:
modifying a validity portion of the second block to indicate that the second block is invalid.

9. The method of claim 1, the third block comprising:
a first reference data portion based at least in part on the second reference data portion of the second block;
a second reference data portion, wherein the second reference data portion of the third block is configured to correspond to a fourth block;
a type block of data that indicates a type of the second transaction;
a transaction detail block of data that includes information describing the second transaction;
an ordering block of data that corresponds to an order in the block chain of the third block relative to the first block and the second block; and
a second signature block of data that identifies a second entity.

10. The method of claim 9, wherein the entity associated with the second block is the same as the second entity associated with the third block.

11. The method of claim 1, further comprising:
modifying a validity portion of the second block to indicate that the second block is invalid.

12. The method of claim 1, further comprising:
receiving from a first computing device a request for the block chain; and
in response to receiving the request for the block chain, transmitting the first block, the second block, and the third block to the first computing device.

13. A method of securely communicating and storing information among a network of computing devices comprising:
generating a first block of a block chain, wherein the block chain is configured according to a first configuration setting and the first block is generated consistent with and based on the first configuration setting, the first block comprising a second reference data portion;
generating a second block of the block chain and adding the second block to the block chain including the first block, wherein the second block is generated consistent with and based on the first configuration setting, the second block corresponding to a first transaction, the second block comprising:
a first reference data portion based at least in part on the second reference data portion of the first block;
a second reference data portion, wherein the second reference data portion of the second block is configured to correspond to a third block;
a transaction detail block of data that includes information describing the first transaction;
an ordering block of data that corresponds to an order in the block chain of the second block relative to the first block; and
a signature block of data that identifies an entity;
reconfiguring the block chain according to a second configuration setting different than the first configuration setting; and
generating the third block of the block chain and adding the third block to the block chain including the first block and the second block, the third block corresponding to a second transaction, wherein the second block is generated consistent with and based on the second configuration setting, the third block comprising a first reference data portion based at least in part on the second reference data portion of the second block.

14. The method of claim 13, the first block comprising a type block of data that indicates the first block is an origin block of the block chain.

15. The method of claim 14, further comprising:
modifying a validity portion of the second block to indicate that the second block is invalid.

16. The method of claim 13, wherein the first transaction corresponds to a document, and wherein the second block does not include the document.

17. The method of claim 13, the first block comprising a first reference data portion, wherein the block chain is reconfigured to the second configuration setting in response to a qualified entity requesting the reconfiguration, the method further comprising determining the qualified entity is qualified to change the configuration of the block chain by proving the qualified entity generated the first reference data portion of the first block.

18. A method of securely communicating and storing information among a network of computing devices comprising:
generating a first block of a block chain, wherein the block chain is configured according to a first configuration setting and the first block is generated consistent with and based on the first configuration setting, the first block comprising a second reference data portion;
generating a second block of the block chain and adding the second block to the block chain including the first block, wherein the second block is generated consistent with and based on the first configuration setting, the second block corresponding to a first transaction, the second block comprising:
- a first reference data portion based at least in part on the second reference data portion of the first block;
- a second reference data portion, wherein the second reference data portion of the second block is configured to correspond to a third block;
- a type block of data that indicates a type of the first transaction;
- a transaction detail block of data that includes information describing the first transaction;
- a signature block of data that identifies an entity;

reconfiguring the block chain according to a second configuration setting different than the first configuration setting; and generating the third block of the block chain and adding the third block to the block chain including the first block and the second block, the third block corresponding to a second transaction, wherein the second block is generated consistent with and based on the second configuration setting, the third block comprising a first reference data portion based at least in part on the second reference data portion of the second block.

19. The method of claim 18, the first block comprising a type block of data that indicates the first block is an origin block of the block chain, the method comprising:
- modifying a validity portion of the second block to indicate that the second block is invalid; and
- wherein the first transaction corresponds to a document, and wherein the second block does not include the document.

20. The method of claim 18, the first block comprising a first reference data portion, wherein the block chain is reconfigured to the second configuration setting in response to a qualified entity requesting the reconfiguration, the method further comprising determining the qualified entity is qualified to change the configuration of the block chain by proving the qualified entity generated the first reference data portion of the first block.

* * * * *

UNITED STATES PATENT AND TRADEMARK OFFICE
CERTIFICATE OF CORRECTION

| | | |
|---|---|---|
| PATENT NO. | : 12,033,143 B2 | Page 1 of 1 |
| APPLICATION NO. | : 18/156765 | |
| DATED | : July 9, 2024 | |
| INVENTOR(S) | : Timothy Fletcher | |

It is certified that error appears in the above-identified patent and that said Letters Patent is hereby corrected as shown below:

In the Claims

Claim 7 Line 40 reads "portion of the first block. invalid" and should read "portion of the first block."

Signed and Sealed this
Third Day of September, 2024

Katherine Kelly Vidal
*Director of the United States Patent and Trademark Office*